(12) United States Patent
Ellis et al.

(10) Patent No.: US 8,327,699 B2
(45) Date of Patent: Dec. 11, 2012

(54) FACTORY STEERING RACK CENTERING USING ELECTRIC POWER STEERING SYSTEM

(75) Inventors: Nathaniel Ellis, Marysville, OH (US); Andrew M. Sweigart, Grove City, OH (US); Nathan Adam Powell, Leeds, AL (US)

(73) Assignee: Honda Motor Co., Ltd., Tokyo (JP)

( * ) Notice: Subject to any disclaimer, the term of this patent is extended or adjusted under 35 U.S.C. 154(b) by 322 days.

(21) Appl. No.: 12/797,345

(22) Filed: Jun. 9, 2010

(65) Prior Publication Data
US 2011/0303478 A1 Dec. 15, 2011

(51) Int. Cl.
*B62D 5/22* (2006.01)
*G01M 17/00* (2006.01)
(52) U.S. Cl. ..................................... 73/117.02; 180/446
(58) Field of Classification Search ............... 73/117.02; 180/446
See application file for complete search history.

(56) References Cited

U.S. PATENT DOCUMENTS

| | | | |
|---|---|---|---|
| 5,544,522 A | 8/1996 | Little | |
| 5,795,997 A * | 8/1998 | Gittins et al. | 73/117.02 |
| 6,055,853 A * | 5/2000 | Roberts et al. | 73/117.02 |

FOREIGN PATENT DOCUMENTS
JP 05-193538 A 8/1993
JP 11-180324 A 7/1999

* cited by examiner

*Primary Examiner* — Kevin Hurley
(74) *Attorney, Agent, or Firm* — Fay Sharpe LLP (57) ABSTRACT

A method is provided for centering a steering rack in an automotive vehicle, particularly a vehicle that includes an electric power steering (EPS) system. The centering method includes locating a center by using an electric motor of the EPS system. The method includes temporarily locking the steering rack in place and subsequently installing a steering wheel to a steering column after the locating step. The method further includes operatively communicating with an on-board processor or ECU of the automotive vehicle and running a program to determine or locate the center of the rack. The method may also include detecting the first and second ends of the rack when at least one of a velocity of the electric motor reaches zero, a current of the electric motor reaches a preselected level, and steering angle of the electric motor stabilizes.

18 Claims, 8 Drawing Sheets

FACTORY STEERING RACK CENTERING USING ELECTRIC POWER STEERING SYSTEM

BACKGROUND

This disclosure relates to centering a steering rack associated with a power steering assembly for an automotive vehicle. More particularly, this disclosure relates to centering of the steering rack at the factory and eliminates use of separate, external power equipment for adjusting a position of the steering rack during the centering process.

Electric power steering (EPS) systems are becoming more widely used and replacing hydraulic power steering systems in automotive vehicles. As part of the EPS, an electric motor is mounted on the steering column or the gearbox and an angular position sensor (resolver) is mounted adjacent to the motor with the primary purpose of allowing brushless motor commutation. An electronic control unit (ECU) or controller on the automotive vehicle operatively receives input data relating to, for example, an angular position and speed of the motor, vehicle speed, pinion torque, etc. The controller processes this data and communicates with or commands the electric motor to provide a desired assistance to the steering system. A number of advantages are associated with EPS systems including decreased weight, increased engine power, no fluid leaks or pump noise, improvements in handling and steering, and an increase in fuel economy. This list of advantages is merely representative and not deemed to be limiting.

As is the case with hydraulic power steering systems, before a steering wheel is installed at the factory in an EPS system, the center of the steering rack must be located. This ensures that the steering wheel angle to each side of the center is roughly equal, i.e., the wheels of the car can be turned substantially the same amount in the right-hand and left-hand turn directions. Currently, an external, powered rotary device is temporarily connected to the automotive vehicle during the manufacturing process and, more specifically, is connected to an input shaft of a steering column. The powered rotary device strokes the steering gearbox or rack to each side (or end) of the rack to find a total stroke, and then finds the center of the rack by identifying the middle between the ends. A mark is oftentimes made for subsequent, accurate installation of the steering wheel or, once the center is located, the steering column is held in place relative to the rack until the steering wheel is mounted and secured in position.

This known arrangement requires the factory to employ special equipment to center the gearbox rack. In addition to the capital costs associated with this specialized centering equipment, there are additional costs associated with maintenance of the specialized centering equipment. Further, this specialized centering equipment has manpower levels measured, for example, in terms of the time associated with the steering centering process. More specifically, there is an average total time associated with temporarily mounting the centering equipment to the automotive vehicle, operating or running the gearbox or rack centering equipment, and subsequently removing the centering equipment from the vehicle.

A need exists that reduces cost, assembly time, and meets or exceeds the associated conventional equipment and process for factory centering of the steering rack.

SUMMARY

A new method is provided for centering a steering rack in an automotive vehicle, particularly a vehicle that includes an electric power steering (EPS) system.

In an exemplary embodiment, the centering method includes locating a center by using an electric motor and the angular position sensor of the EPS system.

The method includes installing a steering wheel to a steering column after the locating step.

The method further includes temporarily locking the steering rack in place until the installing step is completed.

The EPS electric motor and angular position sensor are preferably used for positioning the steering rack at the center and electromechanically holding the rack in the center.

The method further includes operatively communicating with an on-board processor of the automotive vehicle and running a program to determine or locate the center of the rack.

The method may also include detecting the first and second ends of the rack when at least one of a velocity of the electric motor reaches zero, current of the electric motor reaches a preselected level, and angle of the electric motor stabilizes.

A primary benefit of the present disclosure relates to the elimination of specialized centering equipment, and reducing the chance for damaging the vehicle during installation and removal of the equipment.

Another benefit is associated with the cost savings because of reduced maintenance of tooling and reduced capital costs relating to tooling changes.

Still another advantage relates to the decrease in manpower and completing the centering process more quickly.

Further benefits and advantages may be found upon reading and understanding the following detailed description.

DETAILED DESCRIPTION

Figure 1:
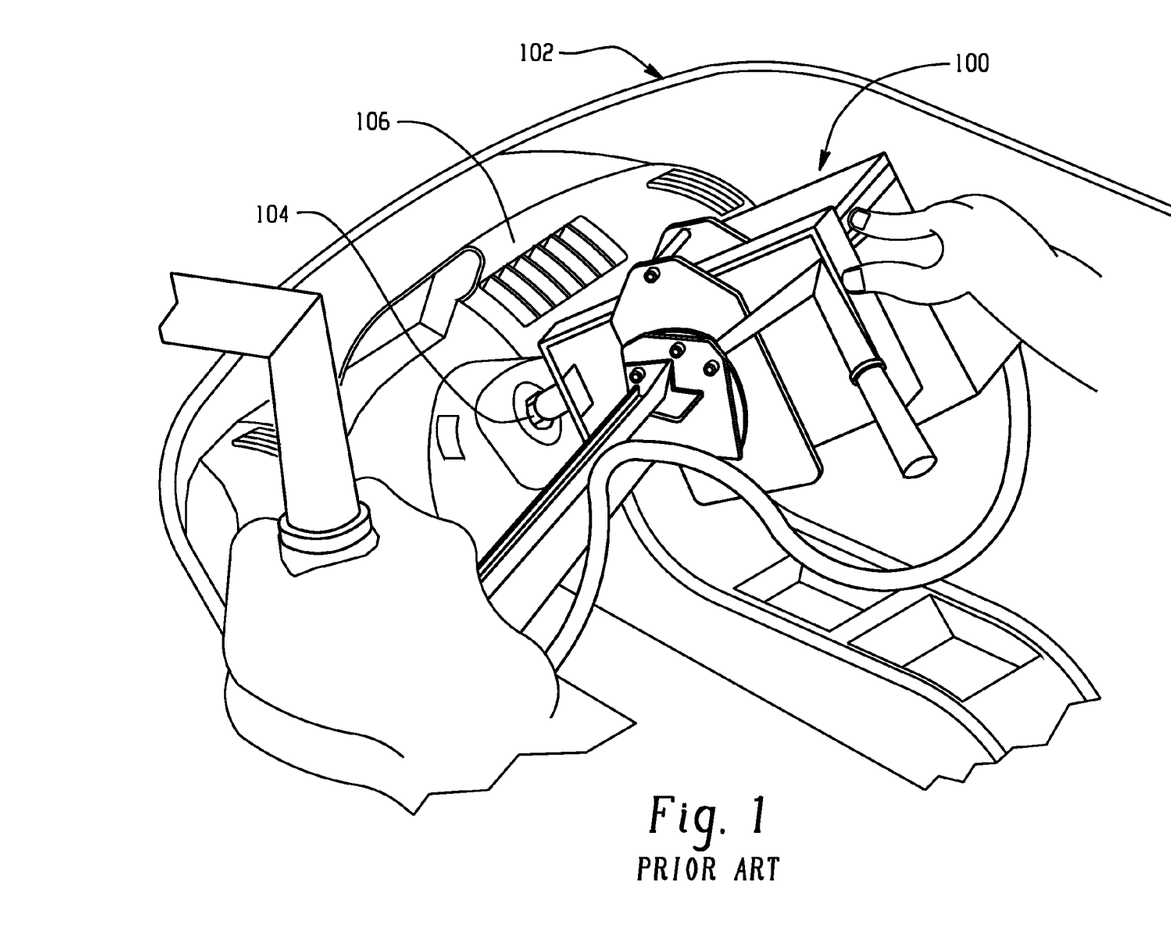
FIG. 1 is a perspective view of a prior steering centering process.

Turning first to FIG. 1, there is shown known, special equipment 100 used to center a gear box or steering rack in an automotive vehicle 102. The equipment 100 is positioned in place within a partially assembled vehicle 102, and a portion of the centering equipment is aligned over and operatively engages a steering column 104 where the steering column extends through a dashboard 106 of the vehicle. The equipment includes motive means, whether a fluid operated or electrical motor, used to rotate the steering column. The motor associated with the centering equipment 100 is powered externally of the automotive vehicle. As part of the centering process, the motor turns the steering column 104 and thus the steering rack through a full stroke; i.e., the equipment moves the rack to one end representative of a full left-hand or right-hand turn, and subsequently proceeds to the other end of the rack being the right-hand or left-hand full turn. Data is recorded in the special centering equipment 100 to determine the distance traveled by the rack and with this data the special centering equipment 100 orients the steering rack at its center position. Oftentimes, a mark is then made so that the steering wheel (not shown) can be properly aligned relative to the steering column 104 for subsequent installation once the centering equipment 100 has been removed from the vehicle.

As will be appreciated by one skilled in the art, temporarily mounting the centering equipment 100 to the automotive vehicle 102, running or operating the rack centering equipment in a manner as generally described above, and subsequently removing the centering equipment from the vehicle, takes a predetermined amount of time. It is estimated that a comparison of the current process with the process to be described below could result in a significant cost savings based on manpower reduction. As noted in the Background, there is also additional savings to be achieved by eliminating the special centering equipment 100 of the type shown in FIG. 1, as well as the maintenance associated with that equipment.

Figure 2:
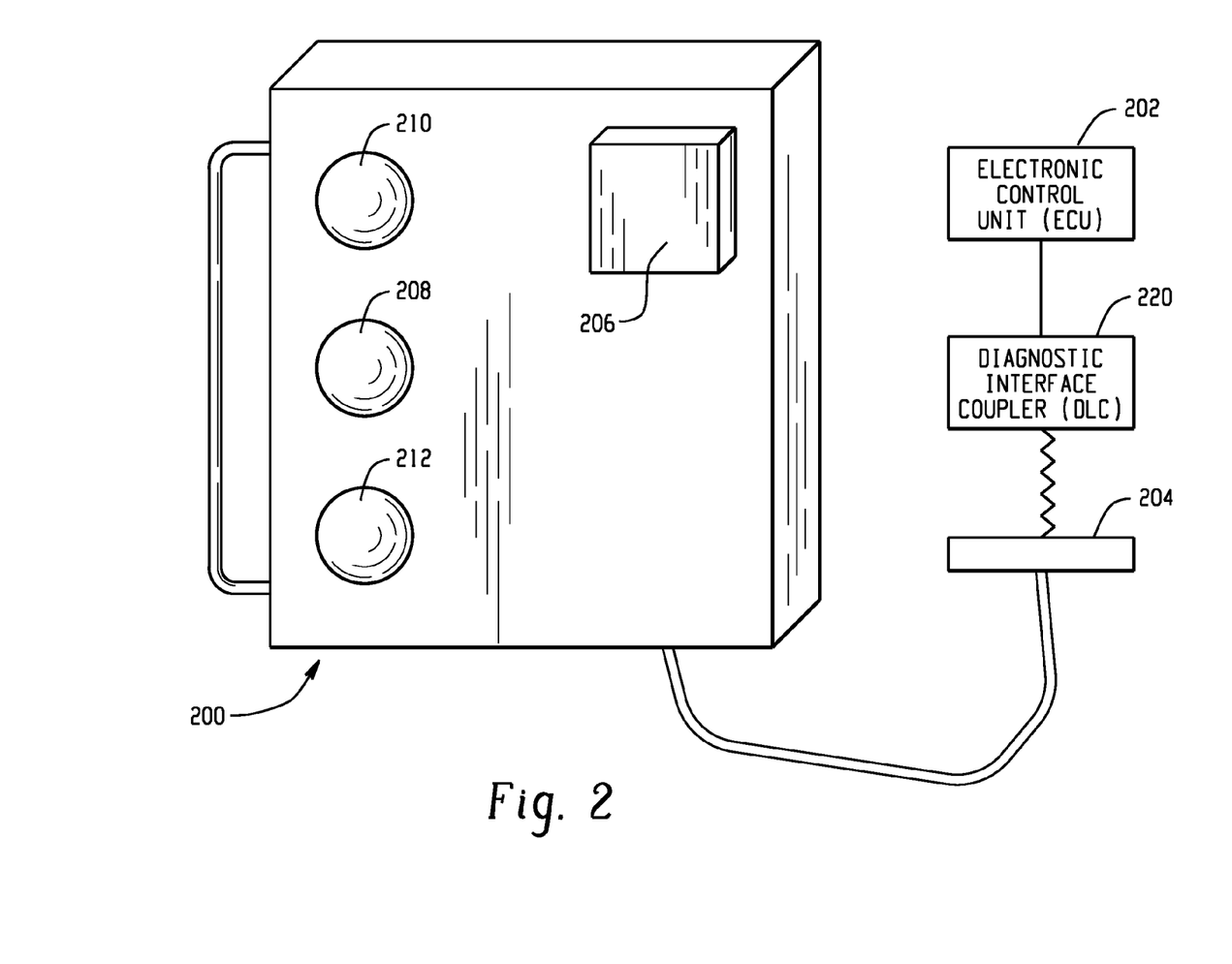
FIG. 2 is a perspective view of an interface box.

FIGS. 2-13 illustrate an exemplary embodiment of the present disclosure that cooperates with and advantageously uses the existing electric power steering (EPS) system of the automotive vehicle being manufactured, and particularly the electric motor thereof, to center the gear box or steering rack. This process eliminates the separate equipment requirement and also significantly reduces manpower, both at significant cost savings for the automotive vehicle manufacturer. More particularly, FIG. 2 shows an interface module 200 that is a relatively compact structure, which in a representative embodiment is on the order of six by nine inches (6"×9"), although the particular dimensions do not form a specific part of the present disclosure but merely illustrate the significantly smaller size when compared to the specialized equipment of FIG. 1. The module 200 interfaces with an EPS electronic control unit (ECU) 202 or on-board diagnostics incorporated into the automotive vehicle. More particularly, the ECU 202 receives and transmits data to various components of the vehicle. A coupling arrangement, such as quick-connect coupler 204, interconnects the interface module 200 with the vehicle ECU/controller 202 through a diagnostic interface coupler (DLC) 220 attached to the vehicle. This coupling arrangement may a be a hard-wired connection, or may be any other suitable connection such that software loaded into the module can effectively communicate with the ECU in order to run a centering program or routine in a manner to be described further below. For example, start button 206 and an indicator, such as a series of light emitting diodes (LEDs) 208, 210, 212 or an alternative graphical display, conveys information regarding the progress of the centering process. For example, the three LEDs are representative of the "cycle in process" 208, the "cycle complete" 210, and an "error" 212. In a similar manner, a start button 206, or similar indicator, may be illuminated to represent that the interface module 200 is powered and in operative communication with the ECU 202 of the automotive vehicle. In this example, only one of the LEDs is typically illuminated at any one time, although the disclosure should not be so limited and also contemplates one or more indicating lights being illuminated at the same time or display of multiple items of information on a display panel.

Figure 3:
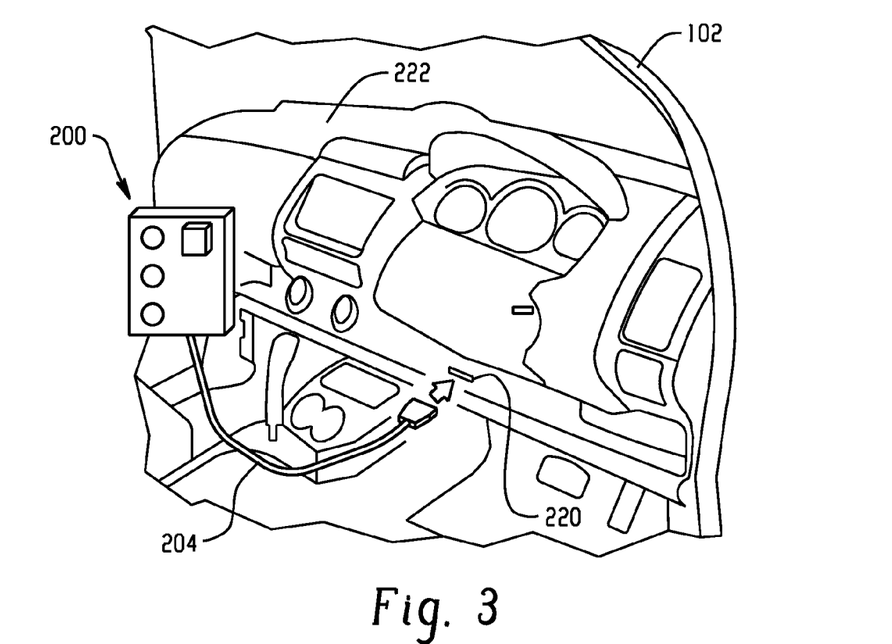
FIG. 3 is a schematic representation of the installation of the interface box of FIG. 2 in the vehicle.
Figure 4:
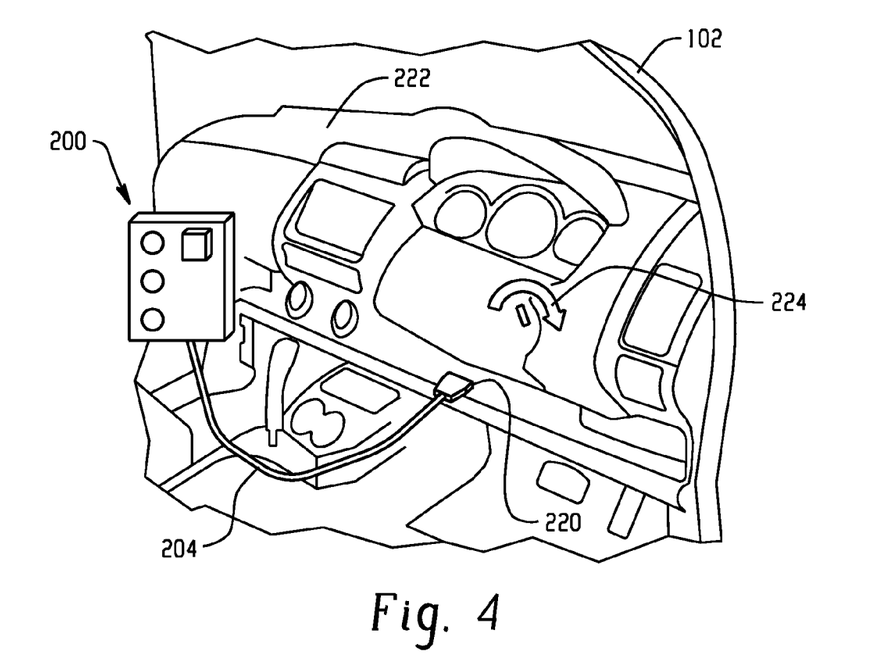
FIG. 4 shows the next step in the process, namely turning the ignition "on".
Figure 5:
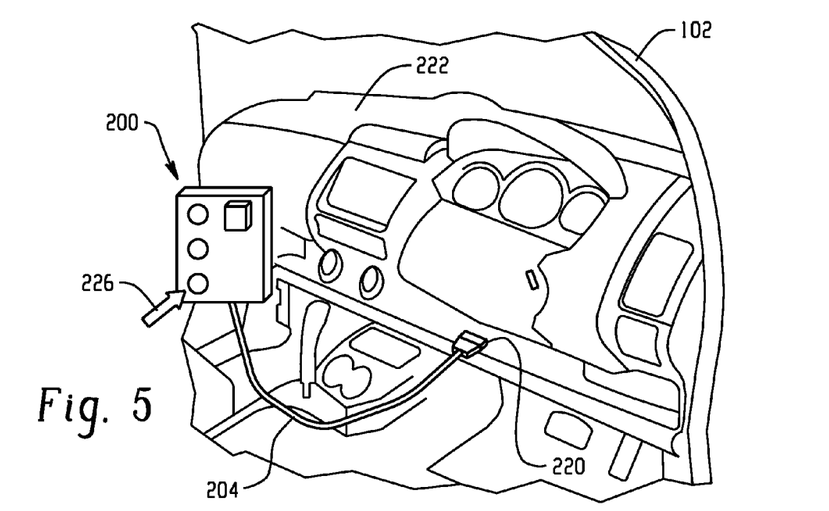
FIG. 5 is a schematic representation of activating the interface box.

With continued reference to FIG. 2, and additional reference to FIGS. 3-6, the module 200 and its cooperation with the automotive vehicle are shown in greater detail. In FIG. 3, the coupler 204 is installed or connected with a mating receiving member, receptacle, or connector 220 in the vehicle. In this exemplary embodiment, the coupler 204 provides a secure wired connection with the automotive vehicle, although it is also contemplated that alternative coupling arrangements, wired or wireless, may be used without departing from the scope and intent of the present disclosure. As is particularly evident in FIGS. 3-6, the steering wheel is preferably not installed during this portion of the centering process in the assembly of the automotive vehicle. For example, the dashboard 222 is installed and the connector 220 may be accessible or located on the dashboard. By turning the ignition "on" in the automotive vehicle as represented by reference numeral 224 in FIG. 4, power is provided to the EPS ECU assembly 202 and may likewise be made available to the interface module 200. Alternatively, the interface module 200 may be independently powered. In any event, the interface module is switched or turned "ON" as represented by reference numeral 226 in FIG. 5. This allows the interface module 200 to transmit and receive data with the onboard ECU 202 of the automotive vehicle.

Figure 6:
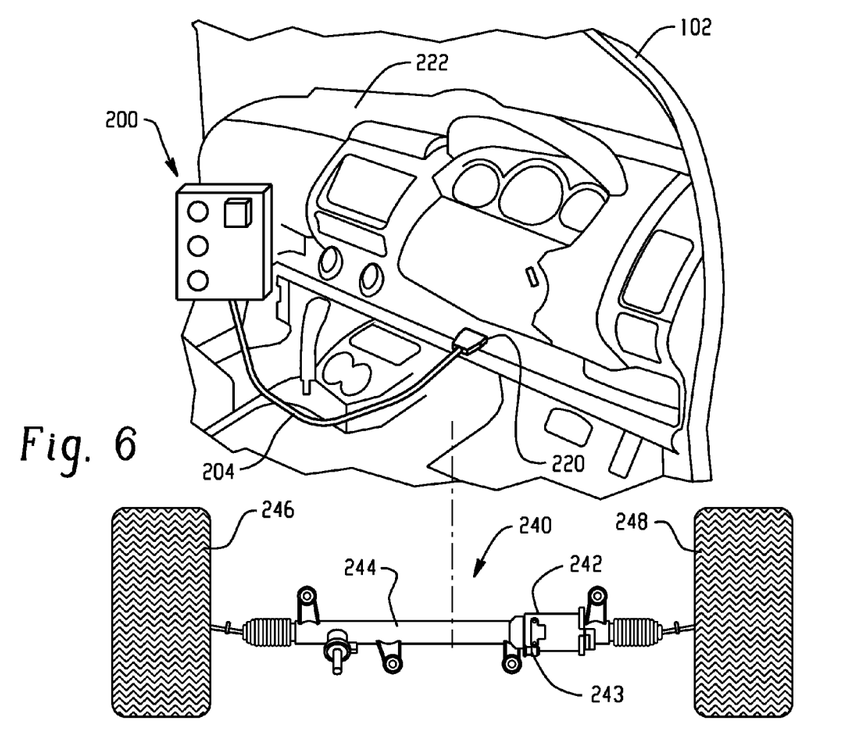
FIG. 6 represents initiation of the steering rack centering process using the electric power steering system.

As represented in FIG. 6, with the ignition "ON", power is also provided to the electric power steering system 240 which includes an electric motor 242. In this manner, the interface module and/or ECU commands the electric motor to find the center of steering rack 244 by turning the wheels 246, 248 through a full stroke. This is more particularly illustrated with reference to FIGS. 7-9. That is, the electric motor 242 of the EPS system 240 is used to move or operate the steering rack through the centering process as initiated and controlled, at least in part, by the interface module 200. For example, in FIG. 7 wheels 246, 248 are rotated through a full right-hand turn so that rack 244 (received in the illustrated housing) is positioned at one end of its stroke. This position information is then available to the ECU from the motor resolver. During the movement, the EPS ECU integrates the motor resolver 243 angular movement to understand the rack stroke amount. Subsequently, the wheels 246, 248 are then turned through a full left-hand turn as represented in FIG. 8. This positions the steering rack 244 at its second end, which position is again known to the ECU 202. Once the two ends of the full right-hand and left-hand turns have been determined, i.e., the rack has been fully stroked from its first end to its second end, the center position may be easily calculated. For example, the angular position of the electric motor 242 can be recorded at the rack end positions schematically represented in FIGS. 7 and 8, and the software of the EPS ECU then proceeds to find the half-way point or calculates a proper steering angle that is representative of the total stroke divided by two. Thus, in FIG. 9, once the center has been calculated, the electric motor is commanded to orient or turn the wheels 246, 248 from the full left-hand turn of FIG. 8 to the halfway point or center of the total stroke.

Figure 7:
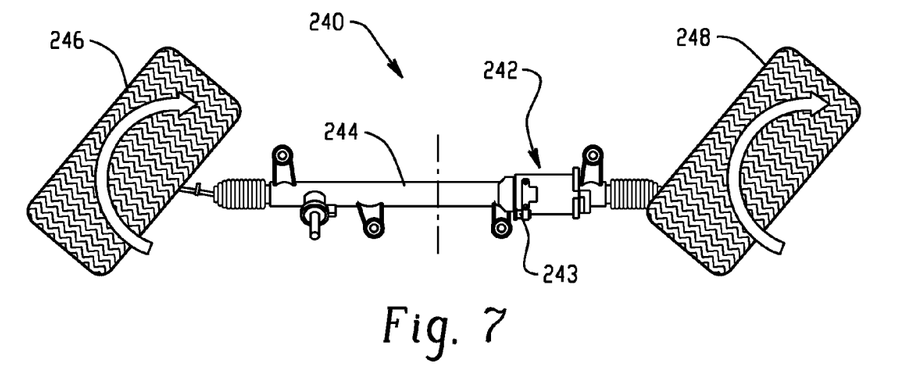
FIGS. 7-9 are schematic representations of the centering process.
Figure 8:
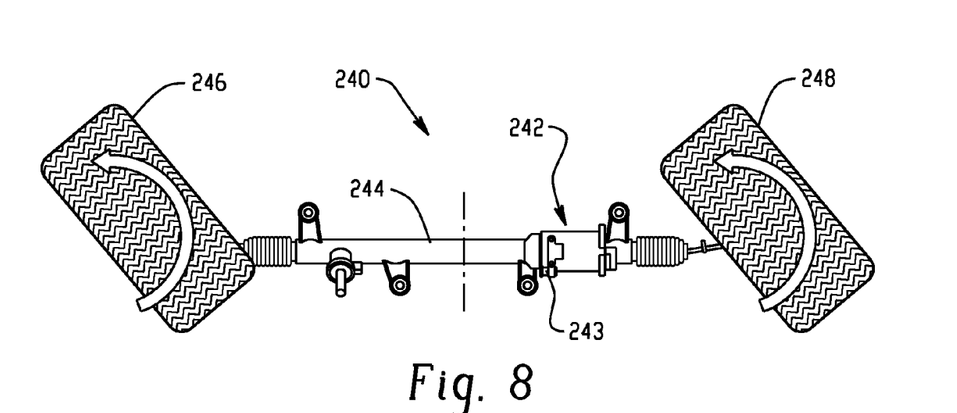
Figure 9:
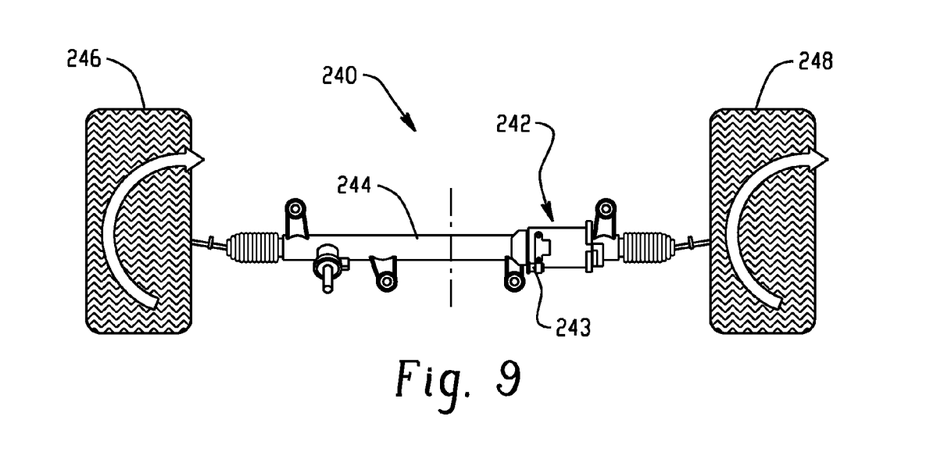

During the process illustrated in FIGS. 7-9, the wheels are moving at all times and the module 200 and particularly the indicator light 208 may be illuminated to represent that the cycle is in process. Once the process has been completed without error and the wheels oriented as shown in FIG. 9, at the center position of the steering rack, the indicator light 210 may then become illuminated to represent completion of the cycle. It will also be appreciated that if an error occurs during the centering process, light 212 may be illuminated which will prompt assembly personnel to re-try the process or proceed through a diagnostic process.

Figure 10:
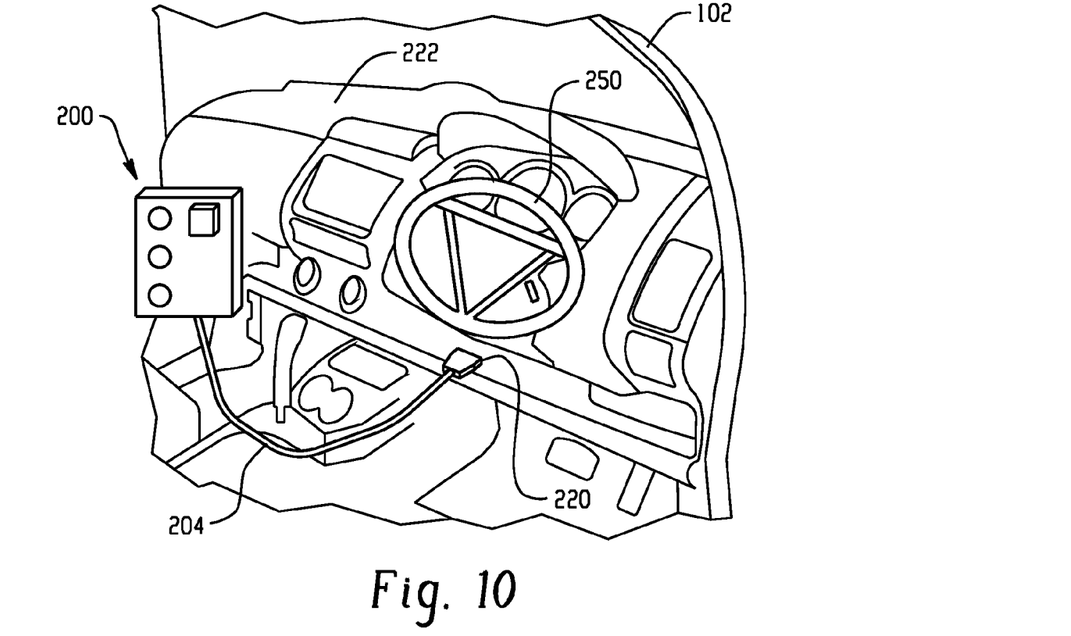
FIG. 10 represents installation of the steering wheel.
Figure 11:
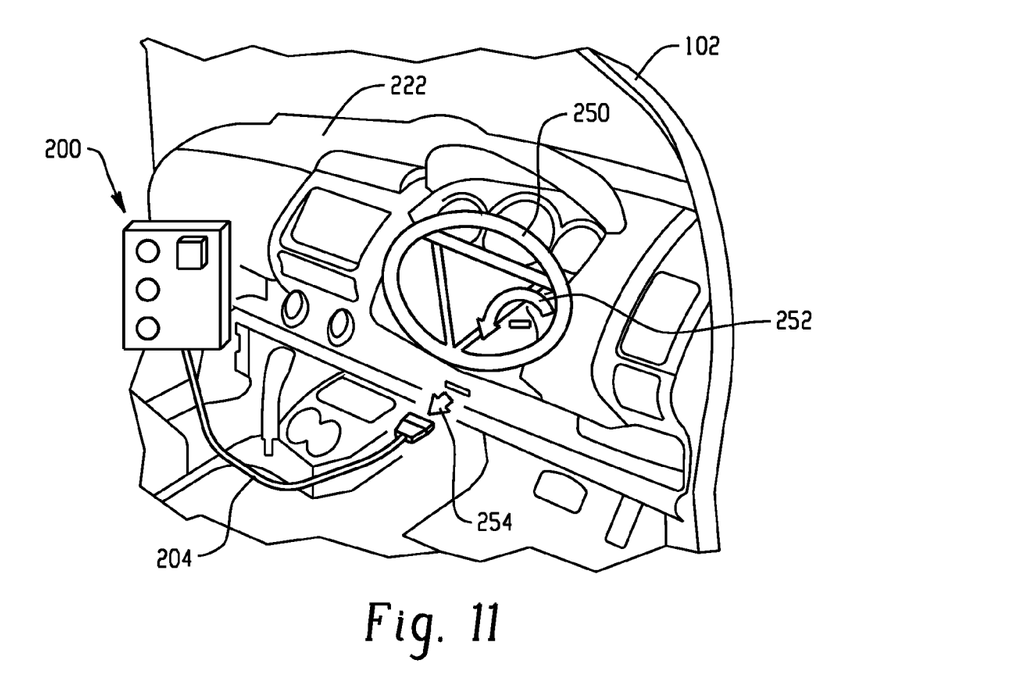
FIG. 11 schematically represents turning the ignition off and removing the interface box from the vehicle.

Another distinct advantage of using the electric motor 242 of the EPS system to perform the centering method of the steering rack is that once the process has been completed and the EPS and associated wheels positioned as shown in FIG. 9, the electric motor serves to electro-mechanically lock the steering system in the centered position. Moreover, the small size of the interface module 200 and the associated coupler 204 allows assembly personnel to easily install steering wheel 250 while the module is still connected as represented in FIG. 10. Once the steering wheel 250 has been successfully installed, the ignition may be turned "OFF" as represented by reference arrow 252 in FIG. 11, and the interface module 200 disconnected as represented by reference numeral 254. Alternatively, the interface module 200 may be disconnected before the steering wheel has been installed.

Figure 12:
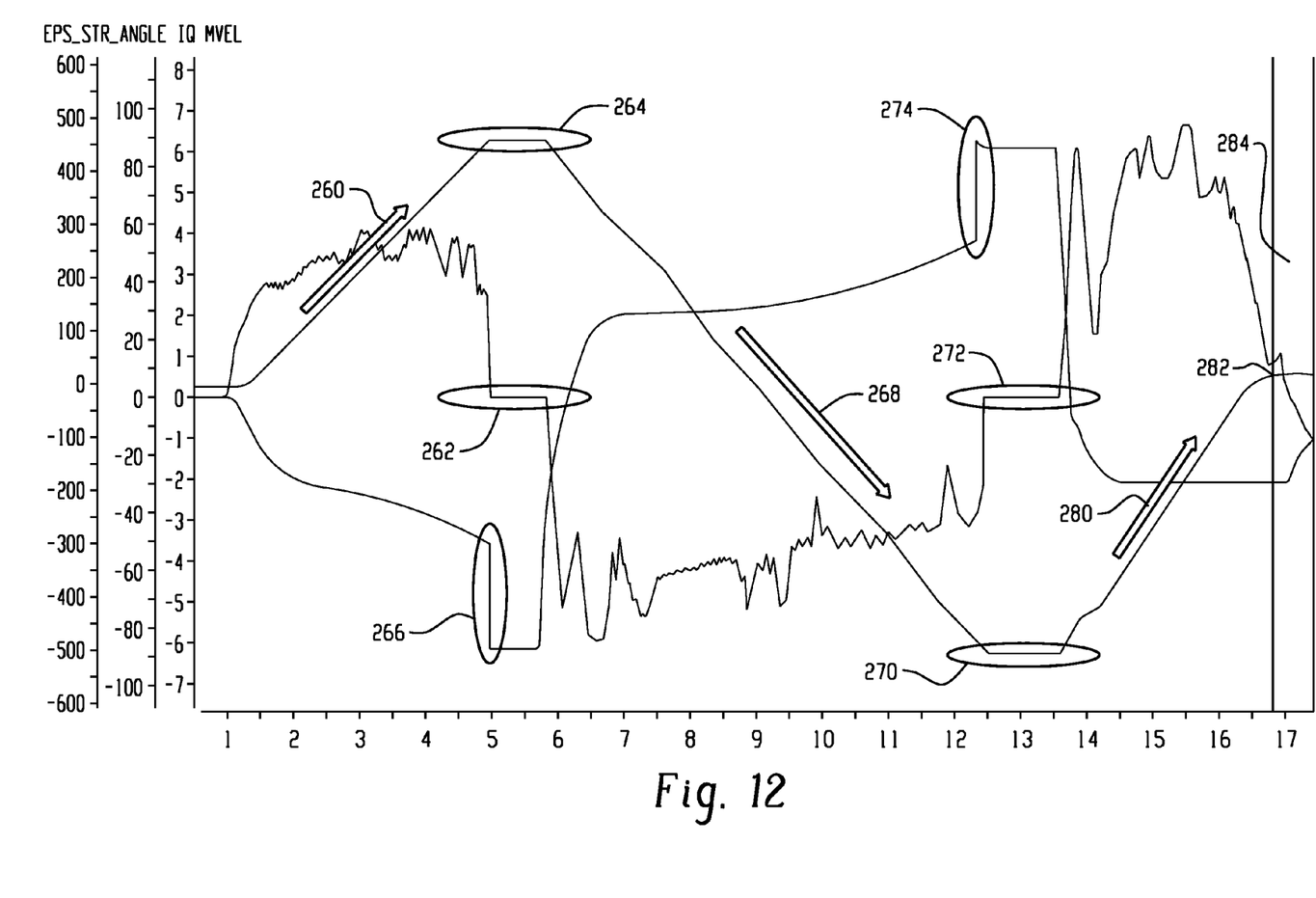
FIG. 12 is a graphical representation of the electronic control unit data during the centering process using the electric power steering.

Turning to FIG. 12, during the centering process, data is received by the electronic control unit 202 of the vehicle. In particular, one implementation of the centering process has the electronic control unit 202 monitor motor velocity, motor angle, and current. Thus, as exemplified in FIG. 12, reference arrow 260 is representative of the initial right-hand turn as shown in FIG. 7. Once the motor velocity reaches zero (0) as represented at region 262 in the data plot representing motor velocity, the position at one end of the rack is represented at plateau region 264 in the data plot, and motor current (also represented in the graph of FIG. 12) has a dramatic change as represented at region 266. These regions, of course, are representative of the steering rack being positioned at one end of the stroke. Thereafter, the motor 242 initiates a full left-hand turn as exhibited in FIG. 8 and represented by reference arrow 268 in FIG. 12. While turning, motor position change is integrated to find the amount of the total angle 268. The end of the total stroke of the rack is evidenced by the plateau at region 270, the motor velocity reaching zero (0) as represented at region 272, and the current substantially increasing over a short period of time as represented at region 274. Each of these data regions 270, 272, 274 is indicative of the opposite end of the rack stroke. Since this information or data is conveyed to the electronic control unit, software programming then easily calculates the steering angle as represented by reference numeral 280 by dividing the total angle 268 (that is, the initial angle is at one end of the stroke and the total angle is calculated when the stroke reaches the other end of the rack) by two and locates the center of the steering rack as represented at region 282 on the graph by monitoring the motor movement. The electric motor is then locked at this angle until the steering wheel installation is complete as represented in region 284. Motor lock is achieved by a feedback loop with a differential angle calculated as the angle target-actual angle.

Figure 13:
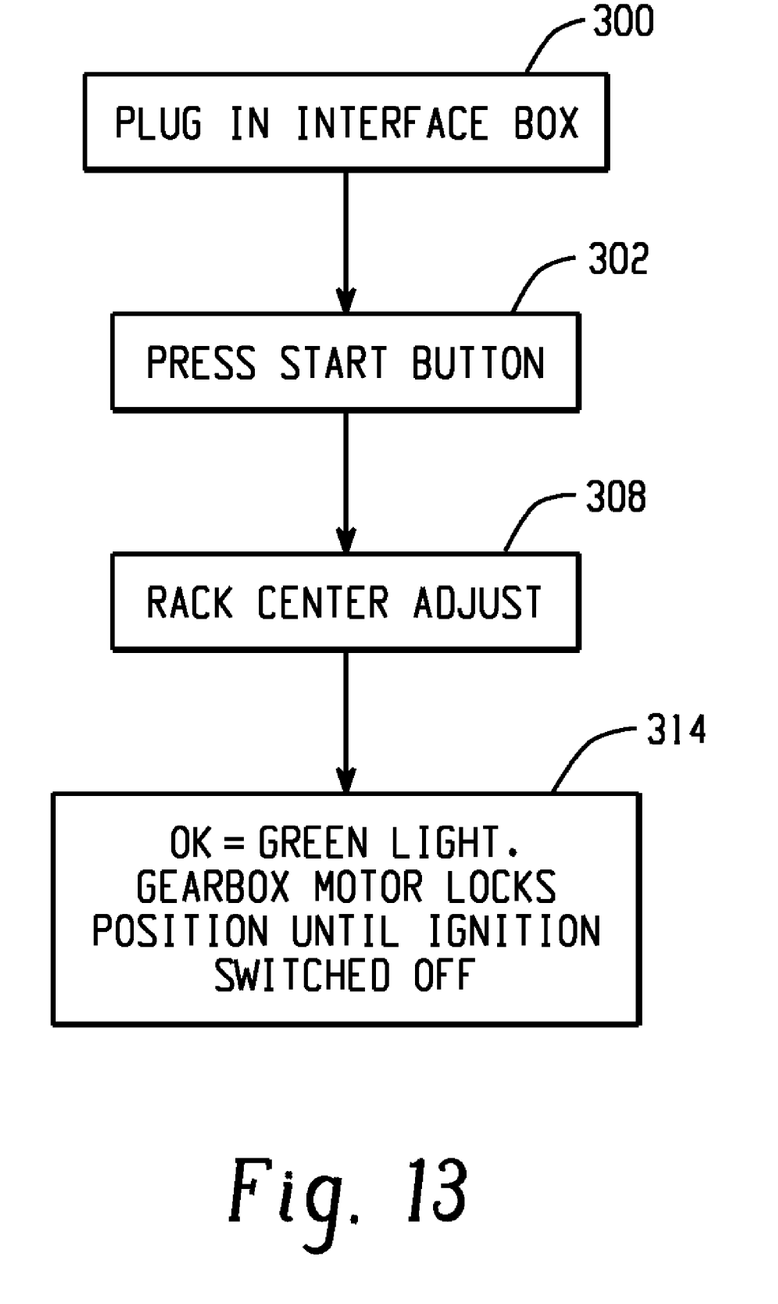
FIG. 13 is a flow chart representative of the interface box logic.

The logic diagram of FIG. 13 provides a simplified overview of the centering process. Particularly, the module 200 is plugged in and communicates via its coupler 204 with the onboard ECU 202 as represented in step 300. The centering program 308 is then initiated such as by pressing the "START" button 206 as represented in step 302. The individual cycle is acknowledged as being completed as represented in step 314, for example, by illuminating an indicator light. Likewise, if an error occurs, an error indicator light may be illuminated and appropriate corrective or diagnostic steps taken in order to complete the centering method.

The disclosure has been described with reference to the preferred embodiment. Obviously, modifications and alterations will occur to others upon reading and understanding the preceding detailed description. It is intended that the disclosure be construed as including all such modifications and alterations in so far as they come within the scope of the appended claims or the equivalents thereof.

The invention claimed is:

1. A method of centering a steering rack in an automotive vehicle that includes an electric power steering (EPS) assembly having an electric motor in the vehicle for steering and an angular position sensor to sense motor angle, the method comprising:
   locating a center of a steering rack of the EPS by using the electric motor and the angular position sensor of the EPS; and
   installing a steering wheel to a steering column after the locating step.

2. The method of claim 1 further comprising temporarily locking the steering rack in place until the installing step is completed.

3. The method of claim 2 wherein the EPS electric motor and angular position sensor are used for positioning the steering rack at the center and electromechanically holding the rack in the center.

4. The method of claim 1 further comprising operatively communicating with an on-board processor of the automotive vehicle and running a program to determine the center of the rack.

5. The method of claim 4 wherein the program running step includes moving the rack with the electric motor to a first end of the rack and subsequently moving the rack to a second end of the rack.

6. The method of claim 5 further includes detecting the first and second ends of the rack when at least one of a velocity of the electric motor reaches zero, current of the electric motor reaches a preselected level, and angle of the electric motor stabilizes.

7. The method of claim 6 further includes moving the rack with the electric motor to a position that is one-half of a total stroke between the first and second ends.

8. The method of claim 1 further comprising operatively coupling an interface controller with on-board vehicle diagnostics.

9. The method of claim 8 further includes generating a first signal if the center is not located or a second signal if the center is located.

10. The method of claim 1 further comprising moving the rack with the electric motor to a first end of the rack and subsequently moving the rack to a second end of the rack;
    communicating data associated with the moving step to an electronic control unit (ECU); and
    positioning the steering rack at the center with the EPS electric motor based on the data communicated to the ECU.

11. The method of claim 10 further comprising temporarily locking the steering rack in place once the steering rack has been centered.

12. The method of claim 11 wherein the temporary locking step includes electromechanically holding the rack at the centered position.

13. The method of claim 12 further including detecting the first and second ends of the rack when at least one of a velocity of the electric motor reaches zero, current of the electric motor reaches a preselected level, and angle of the electric motor stabilizes.

14. The method of claim 10 further including detecting the first and second ends of the rack when at least two of (i) a velocity of the electric motor reaches zero, (ii) current of the electric motor reaches a preselected level, and (iii) steering angle of the electric motor stabilizes.

15. The method of claim 10 temporarily electromechanically locking the steering rack in place once the steering rack has been centered.

16. The method of claim 10 further comprising selectively coupling an interface controller with the ECU.

17. The method of claim 16 further comprising detaching the interface controller from the coupling with the ECU.

18. The method of claim 17 further comprising installing the steering wheel to a steering column of the EPS before the detaching step.

* * * * *